United States Patent
Hall (12)

(10) Patent No.: US 6,580,584 B2
(45) Date of Patent: Jun. 17, 2003

(54) HEAD ASSEMBLY HAVING LEADING EDGE STEP SCHEME FOR TUNED AIR ENTRAINMENT

(75) Inventor: David L. Hall, Salt Lake City, UT (US)

(73) Assignee: Iomega Corporation, Roy, UT (US)

( * ) Notice: Subject to any disclaimer, the term of this patent is extended or adjusted under 35 U.S.C. 154(b) by 182 days.

(21) Appl. No.: 09/841,717

(22) Filed: Apr. 25, 2001

(65) Prior Publication Data

US 2002/0159193 A1 Oct. 31, 2002

(51) Int. Cl.$^7$ ................................................. G11B 5/60
(52) U.S. Cl. .................................................... 360/236.4
(58) Field of Search ........................... 360/236.4, 246.2, 360/235.6, 237.1

(56) References Cited

U.S. PATENT DOCUMENTS

| | | | | |
|---|---|---|---|---|
| 4,191,980 A | * | 3/1980 | King et al. ............... | 360/246.2 |
| 4,652,959 A | * | 3/1987 | Hamada .................... | 360/130.3 |
| 4,814,920 A | * | 3/1989 | Yamano et al. ............ | 360/122 |
| 4,893,204 A | * | 1/1990 | Yamada et al. ........... | 360/236.4 |
| 4,912,582 A | * | 3/1990 | Gomi et al. .............. | 360/99.01 |
| 4,939,603 A | * | 7/1990 | Inumochi .................. | 360/236.4 |
| 4,984,114 A | * | 1/1991 | Takeuchi et al. ......... | 360/236.4 |
| 5,204,795 A | * | 4/1993 | Mitsuhashi ............... | 360/246.1 |
| 5,235,483 A | * | 8/1993 | Hayakawa et al. ....... | 360/246.2 |
| 5,267,108 A | * | 11/1993 | Tani ........................ | 360/236.4 |
| 5,270,889 A | * | 12/1993 | Muratomi ................. | 360/246.2 |
| 5,508,862 A | * | 4/1996 | Lazzari et al. ........... | 360/236.4 |
| 5,636,085 A | | 6/1997 | Jones et al. .................. | 360/103 |
| 5,650,891 A | | 7/1997 | Thayne et al. ............ | 360/99.06 |
| 5,831,791 A | | 11/1998 | Chhabra .................... | 360/103 |
| 5,949,614 A | | 9/1999 | Chhabra .................... | 360/103 |
| 6,104,571 A | * | 8/2000 | Kabasawa ................ | 360/236.4 |

\* cited by examiner

*Primary Examiner*—Brian E. Miller
(74) *Attorney, Agent, or Firm*—Woodcock Washburn LLP (57) ABSTRACT

An improved head assembly having a leading edge step scheme for tuned air entrainment for improved head performance in higher capacity disk drives. The head assembly having a tuned leading edge step scheme improves the performance of the heads by controlling the entrainment of air thereby forming a desired air bearing between a disk surface and the longitudinal rails of each slider of the head assembly thereby forcing the storage media to comply in an advantageous way (e.g., conform) to cause intimacy at the sensor. The improved head assembly having a leading edge step scheme allows the flying characteristics of the head to be controlled by providing a first rail including a sensor for interfacing with the disk media and having a bleed leading edge step that does not entrain air well and a second rail not having a sensor and having a structured leading edge step that entrains air better than the bleed leading edge step of the first rail. The second rail having a good leading edge step for entraining air includes a structured or shaped leading edge step formed between a pair of air dams for trapping and entraining air therebetween. The first rail having a poor leading edge step for entraining air as compared to the second rail allows the sensor to interface (e.g., contact) with the disk media, while the second rail having a good leading edge for the entrainment of air allows the second rail and the balance of the slider to fly over the surface of the disk. This helps to improve the performance of the head assembly for higher capacity disk drives. In addition, the present invention provides for forming one leading edge step differently from the other and for varying the shape and dimensions of the leading edge step to control the flying characteristics of the head assemblies.

24 Claims, 7 Drawing Sheets

HEAD ASSEMBLY HAVING LEADING EDGE STEP SCHEME FOR TUNED AIR ENTRAINMENT

FIELD OF THE INVENTION

The present invention relates in general to magnetic head assemblies for rotating disk drives, and particularly, to head assemblies having a leading edge step scheme for tuned air entrainment.

BACKGROUND OF THE INVENTION

Disk drives of the type that receive data storage media typically have a head assembly for communicating with the storage medium. The data storage cartridge may be of the type that is removable from the disk drive. The storage medium may be disk shaped, and if so, the data storage cartridge may be referred to as a disk cartridge. The head assembly may include a pair of sliders. Each slider is typically mounted on an actuator that is mounted within a disk drive. Additionally, each of the sliders may have a read/write sensor(s) for interfacing with a storage medium of a disk cartridge. The sliders are also commonly referred to as read/write heads.

Generally, the actuator on which the head assembly is mounted moves between a retracted position and an interfacing position. In the retracted position, the heads are disposed in a position that minimizes the likelihood of damage to the heads from either dynamic or static forces. When a disk cartridge has not been inserted into the disk drive, the actuator holds the heads in this retracted position. When a disk cartridge is inserted into the disk drive, the actuator moves the heads to the interfacing position. In the interfacing position, the actuator is in a position in which the heads can interface with the storage medium that has been inserted into the disk drive.

The storage medium with which the head assembly may interface may have a top surface and a bottom surface. Preferably, in the interacting position the storage medium is disposed between the sliders of the head assembly. One of the sliders may be disposed proximal to the top surface, and one of the sliders may be disposed proximal to the bottom surface. In operation, the storage medium of the disk cartridge is rotated between the sliders and an air bearing is created between the storage medium and each of the sliders. As the storage medium is rotated, the storage medium "rides" on this air bearing and the heads interface with the storage medium.

The design of head assemblies is significant because it affects the ability of the heads to interface with the storage medium of the disk drive. In particular, the ability of the heads to interface with the storage medium is a function of the spacing between the sliders and the storage medium. The spacing between the sliders and the media is important because it affects the ability of the disk drive to communicate with the media. Ordinarily, the sliders fly very low with respect to the media, and in some instances, such as with flexible media, a portion of the sliders may contact the media. As the distance between the media and the sliders increases, the signal degrades. With the development of higher density media, it is desired to develop sliders that have even lower fly heights than those previously developed.

For instance, one of the concerns when designing head assemblies is that the spacing between the read/write heads and the storage medium be relatively constant. If the spacing between the read/write heads and the storage medium is not relatively constant, this can cause a degradation in the ability of the heads to interface with the storage medium. The importance of maintaining the spacing between the storage medium and the heads relatively constant is even, more pronounced in disk cartridges that have storage mediums with a relatively high density.

In order to maintain an appropriate spacing between the read/write heads and the storage medium, the air bearing created between the slider and the storage medium should be relatively constant. At high speeds, the flexible storage medium tends to flutter and therefore the importance of maintaining the spacing between the read/write heads and the storage medium is even more pronounced at high speeds. In addition to being dependent on the speed of rotation of the storage medium, the air bearing is a function of the geometry of the head assemblies and the storage medium. Therefore, the geometry of these components is of particular importance.

Slider performance can be measured using several parameters. For example, one important parameter is the "fly height," which is the distance between the magnetic transducer on the read-write head and the magnetic layer on the disk. Another important parameter is "roll," which is the difference between the distance between the inside rail and the disk surface and the distance between the outside rail and the disk surface while the read-write head is flying over the disk. Another important parameter is "pitch," which is the difference between the distance between the leading edge and the disk surface and the distance between the trailing edge and the disk surface while the read-write head is flying over the disk.

A class of conventional sliders are sliders which include a leading edge, a trailing edge, first and second side edges, first and second raised side rails positioned along first and second side edges, respectively, and leading edge tapers for facilitating a flow of air under the side rails during takeoff and for helping to maintain an air bearing under the slider as it flies over the surface of the disk. In this regard, reference is made to U.S. Pat. Nos. 5,831,791 and 5,949,614, both issued to Chhabra (U.S. Pat. No. 5,949,614 is a continuation of U.S. Pat. No. 5,831,791). These patents show and describe an Adjustable Negative Pressure Air Bearing (NPAB) Slider which provides means for controlling the slider characteristics including roll, pitch, fly height, and skew sensitivity. The NPAB slider controls the flying characteristics of the slider by providing a positive pressure, negative pressure, and transition regions whereby the shape of the regions determines the direction and amount of air flowing into the negative pressure region and thus the magnitude and distribution of negative pressure generated. One embodiment of the slider disclosed has side rails with tapered leading edges, and another embodiment includes side rails with leading edge steps.

For high capacity flexible magnetic recording technology, it is desired that there be contact between the flexible media and the part of the head where the sensor is located. The balance of the head should fly over the flexible media in order to maximize the amount of data that can be stored to and read from the surface of a disk.

In addition to affecting the performance of the head assembly, the spacing between the head assembly and the storage medium also affects the life of both the read/write heads and the storage medium. For instance, if the storage medium fluctuates, the storage medium and the heads may wear unevenly and their respective lives may be reduced.

Furthermore, if the air bearing pressure is relatively high, the storage medium and the heads will wear at a faster rate. The amount of fluctuation of the storage medium is a function of a large number of variables, including, for example, the geometry of the head assembly and the storage medium, the cartridge shell, rotational velocity, the media mechanical properties (e.g., size, thickness, substrate material, etc.), and the like. Manufacturing imperfections in head assemblies and/or variations in drives and head assemblies due to large design tolerances have the potential to cause an imbalance of forces between the head assembly and the storage medium and subsequent fluctuations of the storage medium. Accordingly, it is important to design head assemblies, so that the manufacturing tolerances are relatively low and the likelihood of manufacturing imperfections is reduced.

In addition, although it is preferred to have leading edge tapers that are machined, modem manufacturing techniques for higher capacity heads/sensors only support heads that are etched, not machined. As a result, it is necessary to develop improved leading edge steps instead of ramps.

Therefore, a need exists for head assemblies having a leading edge step scheme for tuned air entrainment to improve the performance of the head assemblies for higher speed and higher density applications. This invention includes improved head assemblies for disk drives. This invention also includes disk drives and disk drive actuators that employ the improved head assemblies of this invention.

SUMMARY OF THE INVENTION

According to this invention, an improved head assembly has a first and a second slider for interfacing with a data storage medium of a data storage cartridge. The second slider is preferably disposed below the first slider. The data storage cartridge with which the head assembly of this invention may be employed may be a disk cartridge of the type that can be inserted and ejected from a disk drive. However, the head assembly of this invention may be employed with other types of data storage drives. The head assembly may be a magnetic head assembly and be employed with a magnetic data storage media. However, the head assembly of this invention is not so limited and may be employed with other types of data storage media, such as, optical media. Moreover, the head assembly of this invention may be employed with a variety of types of disk drives, such as, a scanner disk drive, a camera disk drive and a computer disk drive. These examples are not intended to be limiting.

The tuned leading edge step scheme of the present invention relates to a pair of opposed sliders having a tuned leading edge step scheme wherein an air bearing generated under each rail of the slider can be adjusted by controlling the air entrainment characteristics of the first and second longitudinal rails to obtain desired slider flying characteristics. The improved head assembly includes a first and a second slider that each have a first and a second longitudinal rail. These rails preferably extend parallel to the longitudinal axis of the respective slider. Both the first and the second sliders have a tuned leading edge step scheme that comprises one bleed leading edge step and one structured leading edge step formed in the first and the second longitudinal rails, respectively.

The bleed leading edge step is relatively poor at entraining air due to its construction which allows air to bleed out of the step area. This results in a relatively poor air bearing being formed under the first rail. In one embodiment, the bleed leading edge step can include a plain leading edge step. In another embodiment, the bleed leading edge step can include a bleed structure formed as a portion of the first longitudinal end of the first rail and extending into the bleed leading edge step. The bleed structure extends into the bleed leading edge steps to facilitate a flow of air out of a region between the storage medium and the bleed leading edge step thereby further reducing air entrainment. The bleed structure can include, for example, a rectangular shape, a square shape, a triangular shape, a curved convex shape, a semi-circle shape, a semi-oval shape, etc. The bleed structure may extend to the leading edge of the slider, or alternatively, the bleed structure may terminate before reaching the leading edge.

In another embodiment within the scope of the present invention, the bleed leading edge step can include partial air dams and bleed slots formed along the first and second longitudinal sides of the first rail. The partial air dams may extend a predetermined distance from the leading edge toward the trailing edge of the slider. The bleed slots are defined by a trailing edge of the partial air dams and the first longitudinal ends of the first rail. The bleed slots allow a portion of air entrained in the bleed leading edge step to bleed out of the bleed leading edge step thereby reducing air entrainment by the bleed leading edge step.

The structured leading edge step is formed having a pair of air dams disposed longitudinally along the sides of the structured step and is relatively good at entraining air due to its construction having the air dams. This results in a relatively good (e.g., robust) air bearing being formed under the second rail. This tuned leading edge step scheme wherein one rail having a sensor being relatively poor at entraining air and the other rail not having a sensor being relatively good at entraining air, forces the storage medium to comply in an advantageous manner (e.g., conform) to cause intimacy at the sensor.

The sliders may be disposed in the disk drive such that the longitudinal rails of each of the sliders are aligned. Preferably the first longitudinal rail having a bleed leading edge step of each of the sliders is aligned with the second longitudinal rail having a structured leading edge step of the other slider. As described, a storage media may be disposed between the sliders.

Each slider of the head assembly can be formed having one leading edge step constructed differently from the other leading edge step. In addition, the shape and dimensions of the leading edge steps can be varied to control the flying characteristics of the head assemblies.

Each of the sliders preferably may have a magnetic read/write sensor disposed on an end of each of its longitudinal rails. The sensor may be disposed in the first longitudinal rail that has the bleed leading edge step. Through this sensor the head assembly can communicate with a microprocessor. In a preferred embodiment, the head assembly is a magnetic head assembly that has an electromagnetic sensor for communicating with a magnetic data storage media.

Each of the sliders preferably has a leading edge and a trailing edge. The leading edge is that which leads the sliders into the direction of rotation of the storage medium, and the trailing edge is that which trails the direction of motion. The sensor is preferably disposed proximal to the trailing edge of the sliders.

The head assembly of this invention may be disposed on an actuator within a disk drive. In a preferred embodiment of this invention, the head assembly is disposed on a rotary type of actuator, and in an alternative preferred embodiment the head assembly is disposed on a linear type of actuator. The actuator is preferably moveable between a retracted position and an interfacing position. In the retracted position, the head assembly is retracted relative to the area in which the disk cartridge rests within the disk drive when the disk cartridge is inserted into the disk drive. When a disk cartridge is inserted into the disk drive, the actuator may be moved to the interfacing position. In the interfacing position, the head assembly of the actuator is disposed proximal to the storage medium of the disk drive. More particularly, the storage medium may be disposed between the first and the second slider, so that the first slider is disposed proximal to a first surface of the storage medium and the second slider is disposed proximal to a second surface of the storage medium.

The storage medium is preferably rotated as it is positioned between the first and the second slider. As the storage medium rotates, hydrodynamic pressures are created between the first surface of the storage medium and the first slider and the second surface of the storage medium and the second slider. These hydrodynamic pressures are the air bearings between the first surface of the storage medium and the first slider and the second surface of the storage medium and the second slider.

Because of the tuned leading edge step scheme in the longitudinal rails of the sliders, air is bled from the area that is proximal to the bleed leading edge step between the first surface of the storage medium and the first slider and the second surface of the storage medium and the second slider. By bleeding air from these areas, an area of relatively low pressure is created in the area that is proximal to the bleed leading edge steps. In effect, the air bearing is essentially minimized or starved by the bleed leading edge steps. At the same time, air is being entrained by the air dams of the structured leading edge step. As a result, the entrained air of the structured leading edge step forms a relatively high pressure in the area that is proximal to the structured leading edge step and under the second rail. Because of the area of relatively high pressure being opposed by an area of relatively low pressure, the storage medium deflects toward the first rail having the bleed leading edge step and the sensor. The tuned leading edge step scheme forces the flexible media to deflect in an advantageous manner to cause intimacy (e.g., contact) at the sensor. That is the storage medium is deflected upward toward the first longitudinal rail having a sensor of the first slider and downward toward the first longitudinal rail having a sensor of the second slider. Since, as described above, the sensor is disposed proximal to the trailing edge of the first longitudinal rails of the sliders, the storage medium deflects toward the sensor in each slider. The storage medium may even deflect so as to drag or contact the trailing edge of the first longitudinal rail where the sensor is located. By deflecting the storage medium toward the sensors, the performance of the head assembly is enhanced. Other advantages described below may also be achieved by deflecting the storage medium with the tuned leading edge step scheme comprising a bleed leading edge step and a structured leading edge step in each slider.

In a preferred embodiment, the head assembly is a magnetic head assembly that interfaces with a magnetic data storage media. The head assembly may also be used for optical communication with optical data storage media.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DESCRIPTION OF EXEMPLARY EMBODIMENTS AND BEST MODE

The present invention is directed to a dual rail slider having a tuned leading edge step scheme that forces a storage media rotating between opposed sliders of a head assembly to comply in an advantageous manner (e.g., to conform) to cause intimacy at a sensor on each slider. This can be accomplished by forming or shaping the leading edge steps to be relatively "good" or relatively "bad" at entraining air. For example, the sensor rail can be formed having a leading edge step that is bad at entraining air and therefore does not build-up a good air bearing under the sensor rail resulting in the sensor rail flying relatively low over the surface of the flexible media and the sensor interfacing (e.g., contacting) with the flexible media. The non-sensor rail can be formed having a shaped leading edge step that is good at entraining air and therefore builds up a robust (e.g., good) air bearing under the non-sensor rail resulting in the non-sensor rail flying over and not contacting the flexible media. In addition, the present invention provides for forming one leading edge step differently from the other and for varying the shape and/or dimensions of the tuned leading edge steps to control the flying characteristics of the head assemblies. Preferably, leading edge steps are used, instead of leading edge tapers, because the head assembly is for higher capacity drives which currently require that the heads be etched, and not machined. The present invention including a head assembly having a leading edge step scheme for tuned air entrainment helps to improve the performance of the head assembly for higher capacity disk drives.

Figure 1:
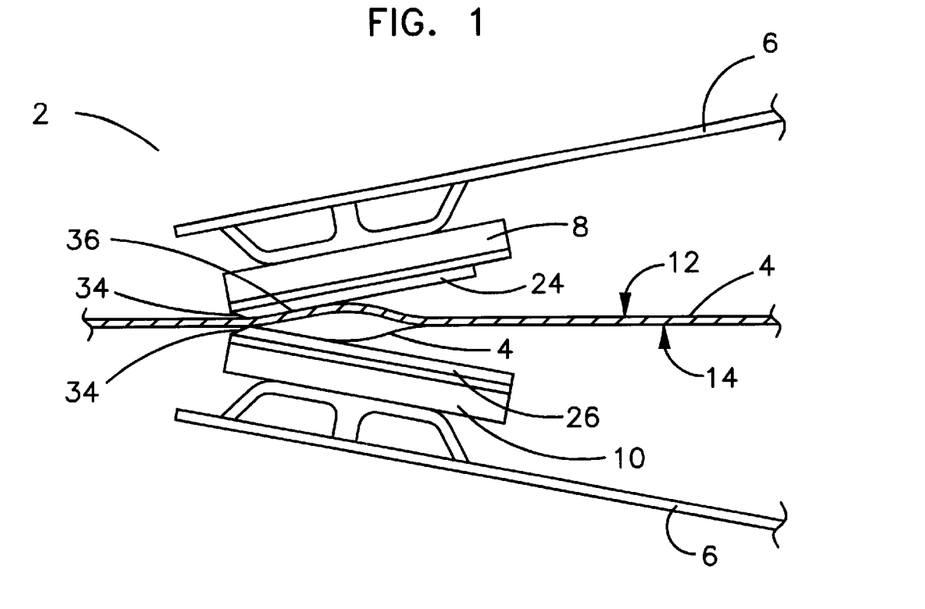
FIG. 1 is a diagrammatical view of the head assembly according to a preferred embodiment of this invention with a storage medium of a disk cartridge.
Figure 4:
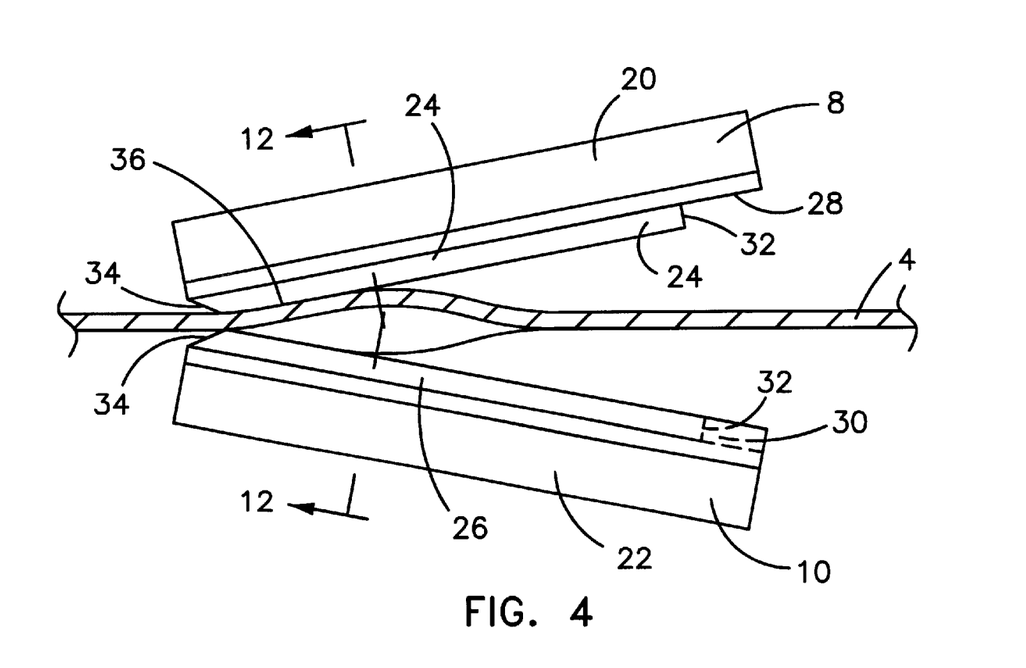
FIG. 4 is a diagrammatical view of the operation of the head assembly of FIG. 1.

This invention includes an improved head assembly 2, as shown in FIGS. 1 and 4, for reading/writing on a data storage medium 4 of a data storage cartridge (not shown). As alluded to above, the improved head assembly 2 of this invention may be used with a variety of types of data storage media, such as magnetic media and optical media. An exemplary data storage cartridge that has a data storage medium 4 is shown in commonly assigned U.S. Pat. No. 5,650,891 entitled "Apparatus For Performing Multiple Functions In A Data Storage Device Using A Single Electro-Mechanical Device," which is hereby incorporated by reference. Even more specifically, the head assembly of this invention may be employed with a magnetic media, such as the Zip® disk cartridge, the Clik® disk cartridge, PocketZip®, HipZip®, and the like.

This invention is directed toward providing enhanced electrical communication with relatively high density media, such as the Zip® disk cartridge or storage media that rotate at higher speeds relative to that of the Iomega Zip® disk cartridge. With the development of media having a density greater than that of the Zip® disk cartridge, improved read/writing devices are needed. The head assembly of this invention also provides improved electrical communication with media having a density that is higher than that of the Zip™ disk cartridge. In the embodiments described below, the head assembly is described as a magnetic head assembly that is employed with flexible magnetic storage media. However, it should be understood that the head assembly of this invention can be employed with other types of media, such as optical media.

In a preferred embodiment, the disk drive with which the head assembly 2 of this invention may be employed may be of one of a variety of types, including but not limited to a stand alone disk drive, a personal computer disk drive, a portable personal computer disk drive, such as in a laptop computer disk drive or a notebook type of computer disk drive, a scanner disk drive, a camera disk drive, a hand-held type of computer disk drive, and the like. For example, the magnetic head assembly of this invention may be employed with the disk drive described in U.S. Pat. No. 5,650,891.

By way of background, the disk drive with which the head assembly 2 of this invention may be employed may have a disk drive motor for operating the disk cartridge, such as, but not limited to, the one shown in U.S. Pat. No. 5,650,891. In this type of disk drive, the disk drive motor is a spindle motor that is disposed in the chassis of the disk drive. When the disk cartridge is inserted into the disk drive, the disk drive motor engages the hub of the disk cartridge. When engaged with the hub of the disk cartridge, the disk drive motor is operated by a microprocessor to rotate the hub and the attached storage medium 4.

Neither the disk drive nor the disk cartridge described above are part of this invention. However, they may be used in combination with the magnetic head assembly 2 of this invention, which is described in detail below.

The head assembly 2 of this invention may be disposed on an actuator 6 within the disk drive. The actuator 6 depicted in part in FIG. 1 may be a linear type of actuator as disclosed in U.S. Pat. No. 5,560,891. Alternatively, the actuator 6 may be a rotary type of actuator as shown in commonly assigned U.S. Pat. No. 5,636,085, entitled "Magnetic Read/Write Head Assembly Configuration With Bleed Slots Passing Through Rails to Stabilize Flexible Medium While Attaining Low Fly Heights With Respect Thereto," which is hereby incorporated by reference.

The head assembly 2 of this invention may include a first slider 8 and a second slider 10. When the actuator is in the interfacing position, described more fully below, the data storage medium 4 may be disposed between the first 8 and the second slider 10, as shown in FIG. 1. In this position, the first slider 8 may be disposed proximal to a first surface 12 of the storage medium 4, and the second slider 10 may be disposed proximal to a second surface 14 of the storage medium 4. As shown, the first slider 8 is disposed above the storage media and the second slider 10 is disposed beneath the storage media. However, the invention is not so limited. The first slider 8 and the second slider 10 are disposed on opposing sides of the media and they may not be disposed above and below each other depending upon the orientation of the media.

Figure 2:
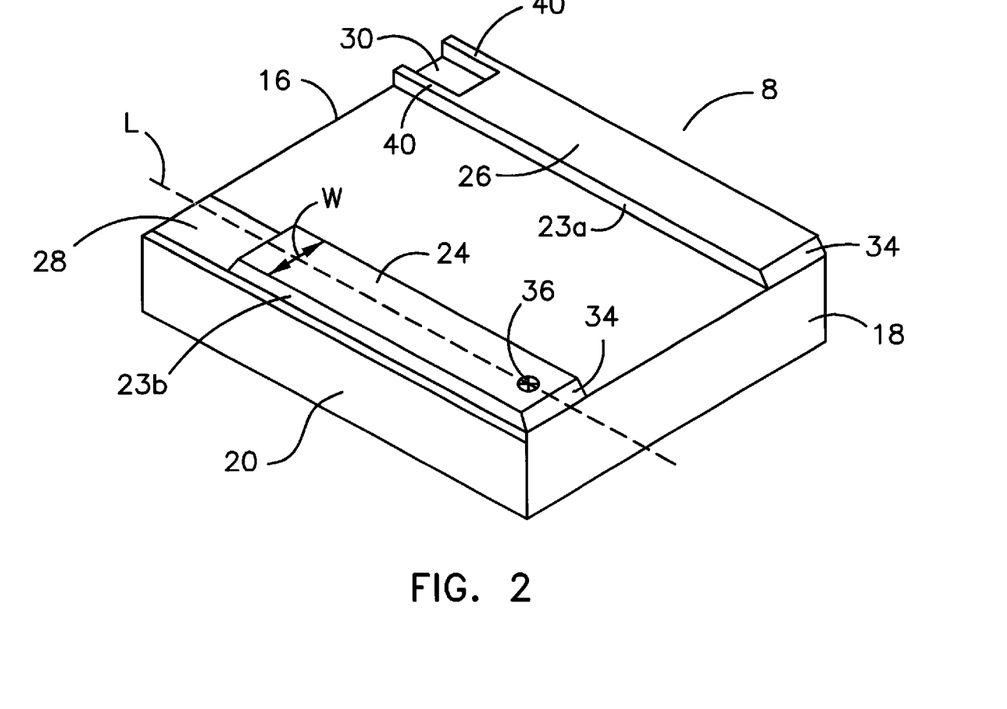
FIG. 2 is an isometric view of a portion of the head assembly of FIG. 1.
Figure 3:
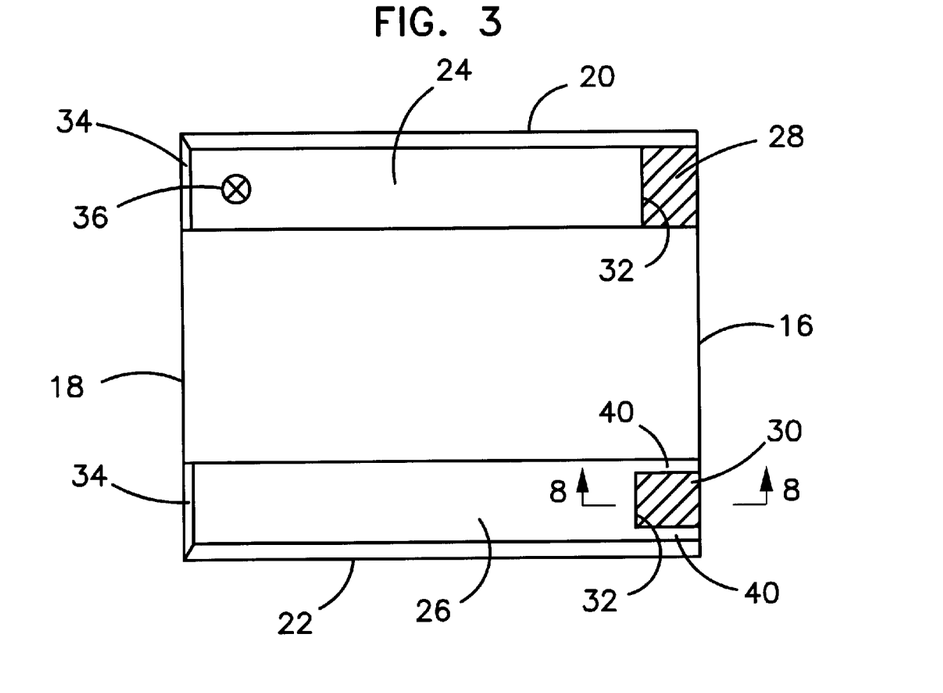
FIG. 3 is a top view of the portion of the head assembly of FIG. 2.

FIGS. 2 and 3 show an exemplary slider having tuned leading edge step scheme for controlling air entrainment and formation of an air bearing under the dual rail slider design. Although only the first slider 8 is shown in FIGS. 2 and 3, it will be appreciated that the second slider 10 is the same as the first slider 8. Accordingly, the following discussion of the first slider 8 applies to the second slider 10. The slider 8 includes a leading edge 16, a trailing edge 18, first and second side edges 20,22, first and second raised side rails 24, 26 positioned longitudinally along first and second side edges 20, 22, respectively, and tuned leading edge steps 28, 30 for controlling air entrainment and for facilitating a flow of air (e.g., an air bearing) under the side rails 24,26 during takeoff and for helping to maintain an air bearing under the slider 8 as it flies/slides over a surface 12 of the disk 4. The dual rail slider having an air bearing formed under each of the rails acts to force (e.g., deflect) the flexible media to comply in an advantageous way (e.g., conform) to cause intimacy at the sensor 36.

Both the first slider 8 and the second slider 10 have a pair of longitudinal rails 24,26, as best shown in FIGS. 2 and 3. The longitudinal rails 24,26 of each of the sliders 8, 10 may extend the length of each of the respective sliders. Each of the rails 24,26 has a first longitudinal end 32 and a second longitudinal end 34. The first longitudinal end 32 of each of the rails 24,26 may be the substantially vertical surface where the raised portion of rails 24,26 step down to the substantially horizontal surface of each of the steps 28,30. The second longitudinal end 34 of each of the rails 24,26 may be the trailing edge 18 of each of the rails 24,26. The leading edge 16 is that end which leads the direction of motion of the slider relative to the storage medium 4, and the trailing edge 18 is that which trails the direction of motion of the slider relative to the storage medium 4. Each rail 24,26 of the first slider 8 and the second slider 10 has a width W that extends transverse to the longitudinal L axis of each of the rails, as shown in FIG. 2. Each of the rails 24,26 has an inner side edge 23a and an outer side edge 23b.

Both the first and the second slider 8, 10 of the head assembly 2 have tuned leading edge steps 28,30 formed in their longitudinal rails 24,26, respectively. The improved head assembly 2 has a tuned leading edge step scheme that allows the flying characteristics of the head to be controlled by providing a first rail 24 having a bleed leading edge step 28 that does not entrain air well and therefore forms a relatively poor air bearing under the first rail 24 and a second rail 26 having a structured leading edge step 30 that entrains air better than the bleed leading edge step 28 of the first rail 24 thereby forming a more robust air bearing under the second rail 26. The first rail 24 includes a sensor 36 for interfacing with the disk media 4 and the second rail 26 does not have a sensor. The tuned leading edge step scheme of forming the steps such that one entrains air better than the other acts to move (e.g., deflect) the storage media 4, allowing one rail 24 having a sensor to fly relatively low and interface with the disk media while the other rail 26 and the balance of the slider is able to fly relatively high over the disk media. The tuned leading edge step scheme thereby improves the performance of the head assembly 2 in flexible media.

As shown in FIGS. 2, 3, 5, 6, 9, and 10, each bleed leading edge step 28, formed on the first rail 24, preferably does not have side air dams 40 to help entrain air and allows air to flow or bleed out of the step 28 thereby forming a poor air bearing relative to structured leading edge step 30. The structured leading edge step 30 has a pair of air dams 40 formed along the longitudinal length of the rail side edges 23a, 23b of the second rail 26 to help entrain air thus forming a more robust air bearing under the second, non-sensor rail 26 as compared to the first, sensor rail 24. The improved head assembly 2 having a tuned leading edge step scheme allows the flying characteristics of the head to be controlled thereby helping to improve the performance of the head assembly 2 for higher capacity disk drives.

When assembled to the actuator 6 as shown in FIG. 1, the first slider 8 is disposed above the second slider 10. Preferably, the sliders are gram-loaded toward each other when assembled to the actuator. The sliders 8, 10 may be assembled to the actuator 6 with any of a variety of fastening techniques and may be mounted to a flexibly mounted suspension arm of the actuator 6. When mounted to the actuator 6 the first rail 24 having a bleed leading edge step 28 of the first slider 8 is disposed above the second longitudinal rail 26 having a structured leading edge step 30 of the second slider 10, as shown in FIGS. 1 and 4. Similarly, the first longitudinal rail 24 having a bleed leading edge step 28 of the second slider 10 is disposed beneath the second longitudinal rail 26 having a structured leading edge step 30 of the first slider 8. This is also understood with reference to FIG. 2, where it can be imagined that the slider of FIG. 2 is mounted as shown in FIG. 1 as both the first slider 8 and the second slider 10.

As shown in FIGS. 2 and 3, the first, bleed leading edge step 28 can be formed as a plain leading edge step which is preferably formed without having any air dams thereby allowing air to bleed out of the sides of the step 28 and reducing the amount of air entrainment under the rail 24. This results in an area of relatively low pressure on the side of the flexible media 4 proximate the bleed leading edge step 28 and the media deflects toward this low pressure area. As a result, the first rail having the sensor has a relatively low flying height over the media, especially as compared to the second rail 26.

As shown in the Figures, the bleed leading edge step 28 of the first rail 24 is formed having two or more surfaces. For example, as shown in FIGS. 2, and 3, the plain or leading edge step 28 includes a first surface being disposed in a substantially horizontal plane and being defined by the leading edge 16, the two rail side edges 23a, 23b, and a bottom edge 47 of the first longitudinal end 32 of the rail, and a second surface being disposed in a substantially vertical plane and being defined by the bottom edge 47 of the first longitudinal end 32, the two rail side edges 23a, 23b, and the top edge 48 of the first longitudinal end 32.

Figure 5:
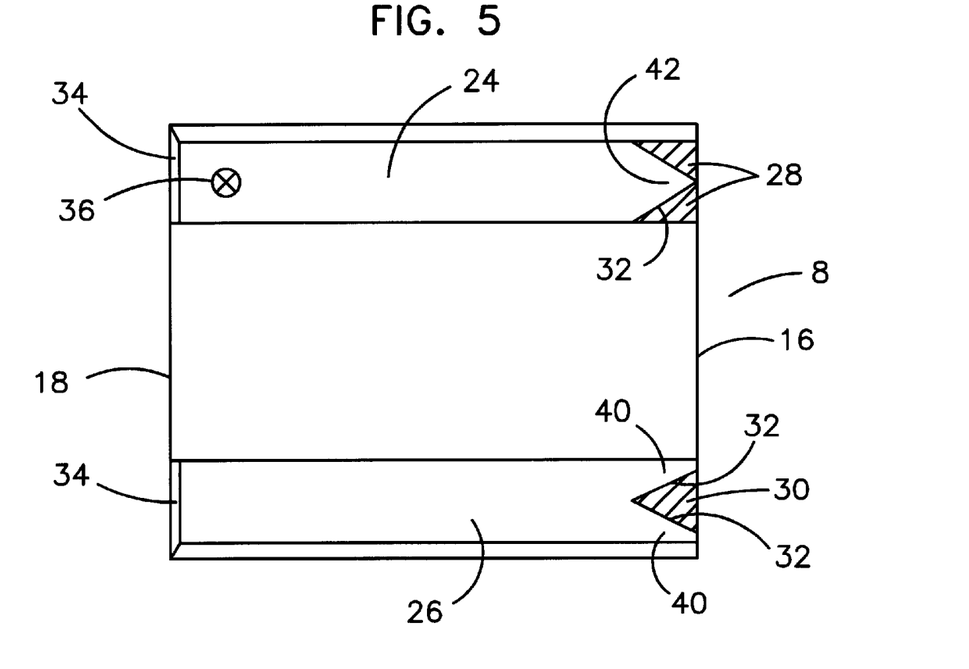
FIG. 5 is a top view of another preferred embodiment of the head assembly of FIG. 1.
Figure 6:
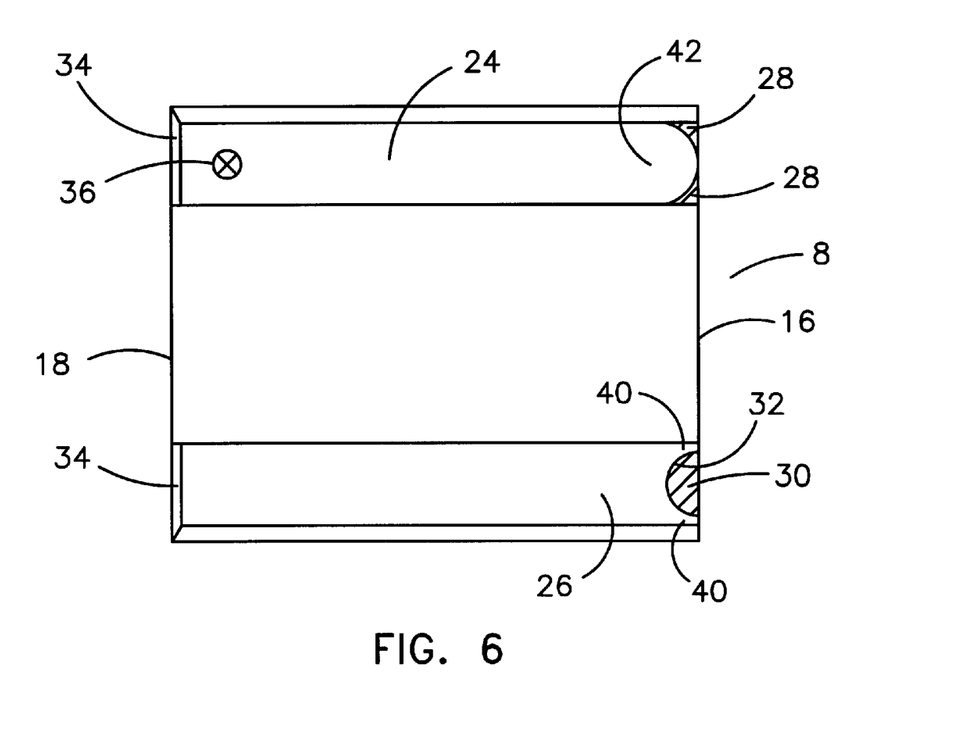
FIG. 6 is a top view of another preferred embodiment of the head assembly of FIG. 1.

As shown in FIGS. 5 and 6, bleed leading edge step 28 can be formed such that it facilitates a flow of air out of the leading edge step 28. As shown, first rail 24 can include a bleed structure 42 formed proximal the first longitudinal end 32. Bleed structure 42 can be a raised portion of the rail 24 and it can extend into a center region of the step 28 toward the leading edge 16. The bleed structure 42 helps to facilitate a flow of air out of the region between the bleed leading edge step 28 and the surface of the storage medium thereby reducing air entrainment. The center raised portion may extend all the way to the leading edge 16, or alternatively, the bleed structure 42 may terminate before the leading edge 16. The bleed structure can include a variety of shapes, as shown in FIGS. 3, 5, 6, 7, 9 and 10, including for example, a rectangular shape, a square shape, a triangular shape, a curved convex shape, a semi-circle shape, a semi-oval shape, etc. The shape and the dimensions of the bleed leading edge step 28 determine the number of surfaces of the bleed leading edge step 28.

In embodiments having a bleed structure 42, the bleed leading edge step includes two or more surfaces. The two or more surfaces include at least one surface being disposed in a substantially horizontal plane and being defined by the leading edge 16, the inner and outer rail sides 23a, 23b, and a bottom edge 47 of the bleed structure 42 (e.g., the bottom edge of the first longitudinal end 32), and at least a second surface being disposed in a substantially vertical plane and being defined by the bottom edge 47 of the bleed structure 42, the first and second rail side edges 23a, 23b, and a top edge 48 of the bleed structure 42 (e.g., a top edge of the first longitudinal end 32).

As shown in FIG. 5, the bleed structure 42 has a triangular shape (e.g., in the shape of an arrow) and extends all the way to the leading edge 16. This results in the bleed leading edge step 28 having four surfaces. A first surface being disposed in a substantially horizontal plane and being defined by the leading edge 16, the inner side 23a, and the bottom edge 47 of the bleed structure 42, a second surface being disposed in a substantially horizontal plane and being defined by the leading edge 16, the outer side 23b, and the bottom edge 47 of the bleed structure 42, a third surface being disposed in a substantially vertical plane and being defined by a bottom edge 47 of the bleed structure 42, the inner side 23a, a center edge of the bleed structure 42 (e.g., the apex of the arrow shaped bleed structure), and a top edge 48 of the bleed structure 42, and a fourth surface being disposed in a substantially vertical plane and being defined by the bottom edge 47 of the bleed structure 42, the outer side 23b, the center edge of the bleed structure 42, and the top edge 48 of the bleed structure 42. It should be appreciated that for embodiments where the bleed structure 42 does not extend all the way to the leading edge 16, then only three surfaces would be formed because the first and second surfaces described above would form a single surface disposed substantially in the horizontal plane and being defined by the leading edge 16, the inner and outer side edges 23a, 23b, and the bottom edge 47 of the bleed structure 42.

As shown in FIG. 6, the bleed structure 42 can be formed having a semi-circle shape where the raised portion of rail 24 forms a convex shape toward the leading edge 16. As shown, the bleed structure 42 is formed extending to the leading edge 16 and accordingly, the bleed leading edge step 28 is formed having three surfaces including a first surface being disposed in a substantially horizontal plane and being defined by the leading edge 16, the inner side 23a, and a bottom edge 47 of the bleed structure 42, a second surface being disposed in a substantially horizontal plane and being defined by the leading edge 16, the outer side 23b, and a bottom edge 47 of the bleed structure 42, and a third curved surface being disposed in a substantially vertical plane and being defined by the bottom edge 47 of the bleed structure 42, the inner and outer rail sides 23a, 23b, and a top edge 48 of the bleed structure 42. In an embodiment having a curved surface that does not extend all the way to the leading edge 16, it will be appreciated that only two surfaces would be formed, including a first surface being disposed in a substantially horizontal plane and being defined by the leading edge 16, the inner and outer sides 23a, 23b, and a bottom edge 47 of the bleed structure 42, and a second curved surface being disposed in a substantially vertical plane and being defined by the bottom edge of the bleed structure 42, the inner and outer sides 23a, 23b, and the top edge 48 of the bleed structure 42.

Figure 7:
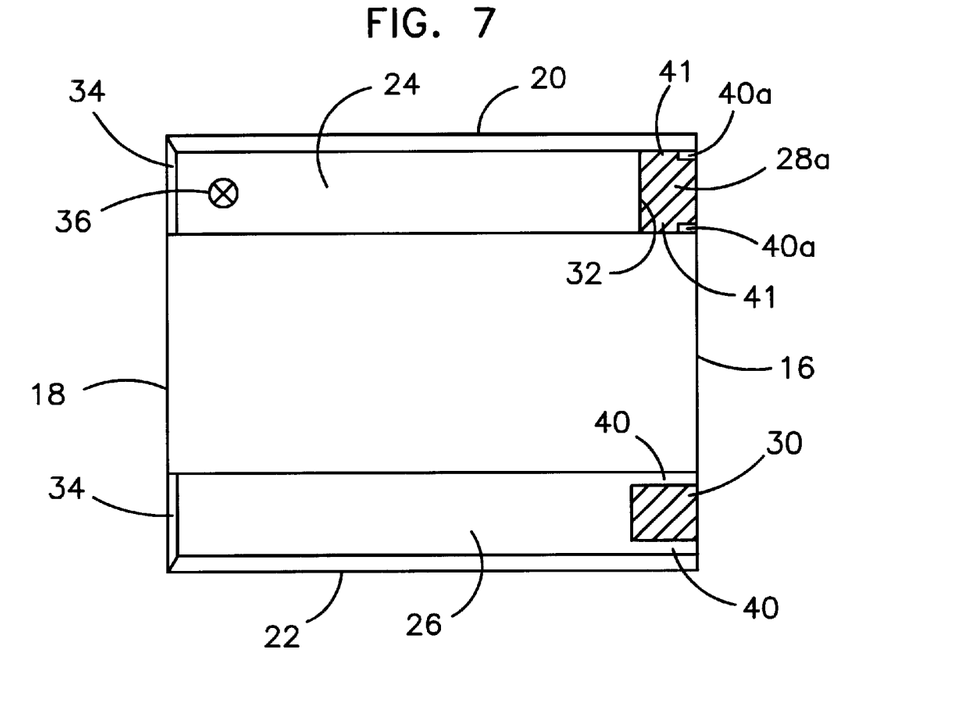
FIG. 7 is a top view of another preferred embodiment of the head assembly of FIG. 1.

FIG. 7 shows another embodiment of the present invention wherein the bleed leading edge step 28a is formed having one or more partial air dams 40a and one or more bleed slots 41. As shown in FIG. 7, the partial air dams 40a are disposed longitudinally along the sides 23a, 23b and extend a predetermined distance from the leading edge 16 toward the trailing edge 18. The bleed slot 41 is formed along the longitudinal edges of the step and is defined between the trailing edge of the partial air dams 40a and the first longitudinal end 32 of the raised rail 24. The bleed slots 41 can be formed transverse to the longitudinal length of the first rail 24, or alternatively, the bleed slots 41 can be formed at an angle or having a curved construction. The bleed slots 41 allows the step 28a to entrain air along the leading edge 16 of the slider and then allows a portion of the entrained air to bleed out of the step area at a point just prior to the first longitudinal end 32 of the raised rail 24. This reduces the amount of air that is entrained by the bleed air step 28a and thereby result in a less robust air bearing (e.g., an air bearing having a relatively low pressure) under the sensor rail 24.

The structured leading edge step 30 of the second rail 26 is formed such that it is relatively good at entraining air and thus forms a more robust air bearing under the second rail 26. As a result, the relatively high pressure of the air bearing under the second rail 26 causes the media under the rail 26 to deflect away from the non-sensor rail 26 and toward the sensor rail 24. The second, non-sensor rail 26 has a relatively high fly height, especially as compared to the first rail 24.

As shown in the Figures, the structured leading edge step 30 of the second rail 26 includes a pair of air dams 40. As shown, the air dams are formed along the longitudinal length of the structured step 30 proximate the rail side edges 23a, 23b. The air dams 40 act to capture or trap air within the structured step 30 to facilitate an entrainment of air thereby improving the air bearing under the second rail 26 and deflecting the media 4 under the rail 26. The air dams 40 help to further entrain air and form a more robust (e.g., good) air bearing under the second rail 26.

Figure 8:
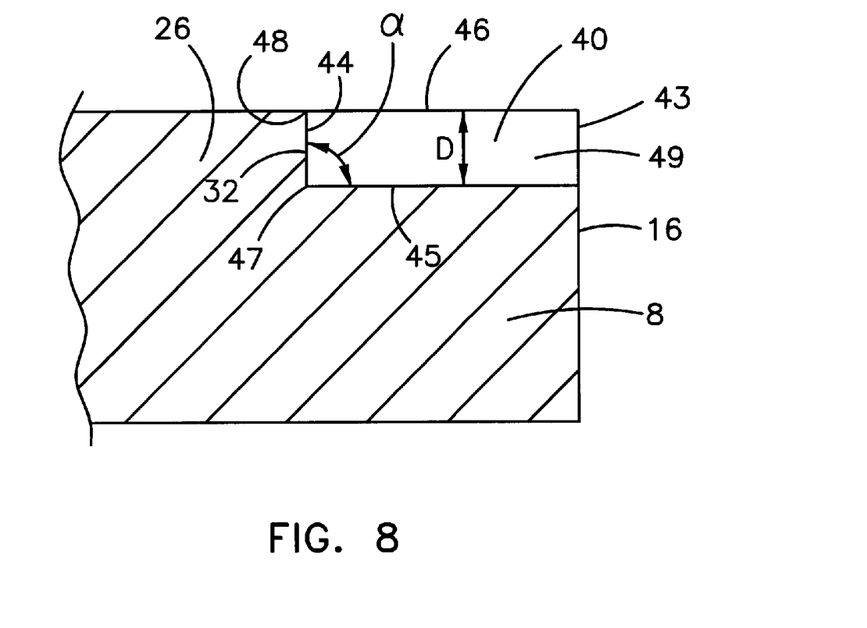
FIG. 8 is a partial cross-section of the structured leading edge step taken along line 8—8 of FIG. 3.

FIG. 8 shows a partial cross-section of the slider 8 of FIG. 3. As shown in FIG. 8, each air dam 40 includes a leading side edge 43, a trailing side edge 44, a bottom edge 45, and a top edge 46. Each air dam also includes an interior surface 49 defined by leading side edge 43, trailing side edge 44, bottom edge 45, and top edge 46. The first longitudinal end 32 has a bottom edge 47 and a top edge 48. Each leading edge step has a step angle $\alpha$ which is formed between the substantially horizontal surface of each step and the substantially vertical surface of the first longitudinal end 32. For example, the substantially horizontal surface of each step may have a slight taper, or incline, from the leading edge 16 to the bottom edge of the first longitudinal end 32 and/or the substantially vertical surface of the first longitudinal end 32 may have a slight taper toward the trailing edge from the bottom edge 47 to the top edge 48. The slight taper, if any, of the substantially horizontal surface of each step and/or substantially vertical surface of the first longitudinal end 32 is generally on the order of about 1–5 degrees. The step angle $\alpha$ may be formed as a right angle, or preferably, the step angle $\alpha$ is formed having an angle slightly greater than 90 degrees. For example, in one preferred embodiment, the step angle $\alpha$ is an angle of about 90 degrees to about 95 degrees. Preferably, the depth D of the step is about 0.5 $\mu$m. Generally, $\alpha$ may vary depending on the application and is a function of the manufacturing process and the slider material.

The structured leading edge step can include a variety of shapes, including for example, a rectangular shape, a square shape, a triangular shape, a curved concave shape, a semi-circle shape, a semi-oval shape, etc. The shape of the structured step 30 determines the number of surfaces that the structured leading edge step will have.

FIGS. 2 and 3 show the structured leading edge step 30 of the second rail 26 being formed having a rectangular shape. As shown, the structured leading edge step 30 includes four surfaces. A first surface being disposed in a substantially horizontal plane and being defined by the leading edge 16, the bottom edges 45 of the two air dams 40, and the bottom edge 47 of the first longitudinal end 32. A second surface being disposed in a substantially vertical plane and being defined by a bottom edge 47 of the first longitudinal end 32, the trailing edge 44 of the two air dams 40, and the top edge 48 of the first longitudinal end 32. The third and fourth surfaces being disposed in a substantially vertical plane and being defined by the inner sides of the two air dams 40, including bottom edge 45, the top edge 46 the leading side edge 43, and the trailing side edge 44.

FIG. 5 shows the structured leading edge step 30 of the second rail 26 being formed having a triangular shape. As shown, the structured leading edge step 30 includes three surfaces. A first surface being disposed in a substantially horizontal plane and being defined by the leading edge 16 and a bottom edge 45 of each of the two air dams 40 (e.g., the bottom edge of the first longitudinal end 32). The second and third surfaces being disposed in a substantially vertical plane and being defined by the inner sides of the two air dams 40, including bottom edge 45, the top edge 46 the leading side edge 43, and the trailing side edge 44.

FIG. 6 shows the structured leading edge step 30 of the second rail 26 being formed having a semi-circular shape with a curved concave shape toward the leading edge 16. As shown, the structured leading edge step 30 includes two surfaces. A first surface being disposed in a substantially horizontal plane and being defined by the leading edge 16 and the bottom edge 45 of the curved air dams 40 (e.g., the bottom edge of the first longitudinal end 32). A second surface being disposed in a substantially vertical plane and being defined by the bottom edge 45 of the curved air dams 40 (e.g., the bottom edge of the first longitudinal end 32) and the top edge 46 of the curved air dams 40 (e.g., the top edge of the first longitudinal end 32).

Figure 11:
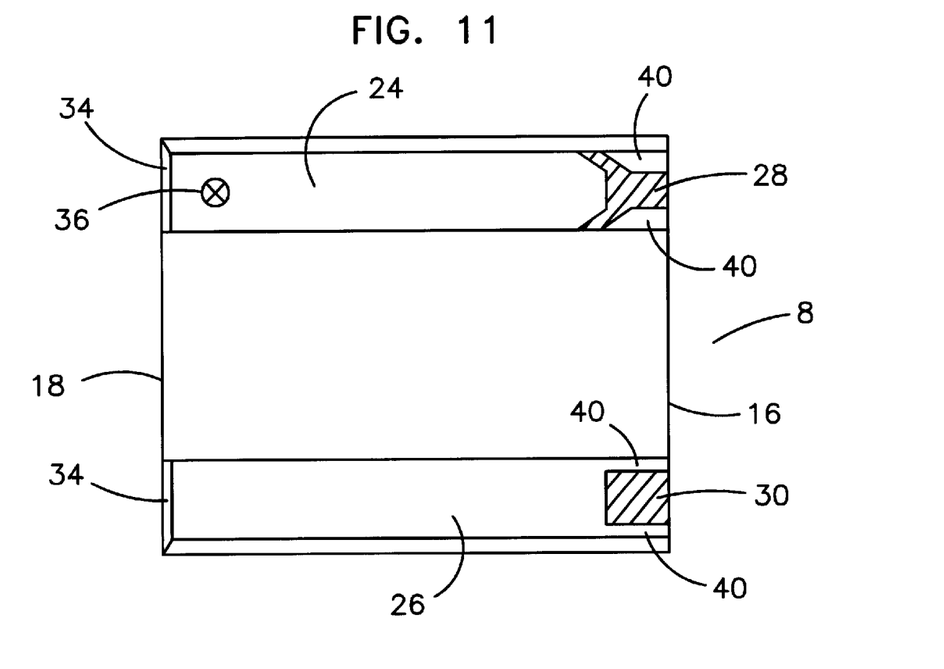
FIG. 11 is a top view of another preferred embodiment of the head assembly of this invention.

Preferably, the bleed leading edge step 28 and the structured leading edge step 30 are formed on each rail 24, 26 proximate the leading edge 16 of each slider 8, 10. Even more preferably the bleed leading edge step 28 is formed on the first rail 24 having a sensor disposed therein and the structured leading edge step 30 is formed on the second rail 26 which does not have a sensor. The bleed leading edge step 28 and the structured leading edge step 30 of the first slider 8 are preferably similar to, or the same as, the bleed leading edge step 28 and the structured leading edge step 30 of the second slider 10. The bleed leading edge step 28 and the structured leading edge step 30 may have a variety of shapes, as shown in FIGS. 3, 5, 6, 7, 10, and/or may have a variety of dimensions, as shown in FIG. 11.

In each of these embodiments, the bleed leading edge step 28 and the structured leading edge step 30 of the second slider 10 would match the bleed leading edge step 28 and the structured leading edge step 30 of the first slider 8, and the structured leading edge step 30 is always aligned with a longitudinal rail of the other slider that has a bleed leading edge step 28 and the and the bleed leading edge step 28 is always aligned with a longitudinal rail of the other slider that has a structured leading edge step 30. As described in further detail below, one of the functions of the tuned leading edge step scheme is to facilitate the deflection of the storage medium 4 of the disk cartridge.

Figure 9:
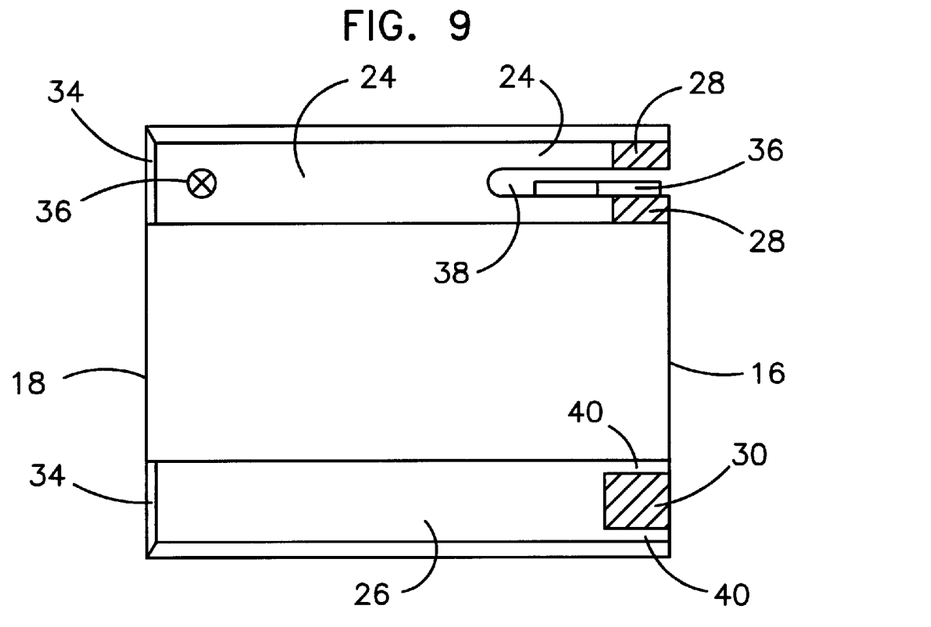
FIG. 9 is a top view of another preferred embodiment of the head assembly of this invention.
Figure 10:
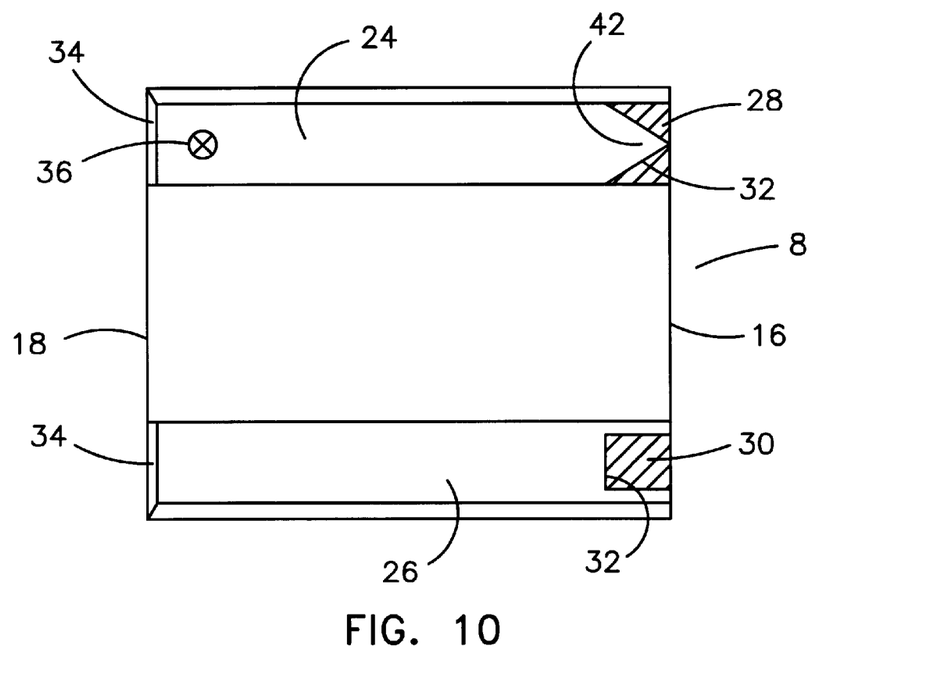
FIG. 10 is a top view of another preferred embodiment of the head assembly of this invention.

Preferably, the first rail 24 of each of the sliders 8, 10 has a sensor 36 and a wire or flex circuit (not shown) for electrically communicating with the sliders 8, 10. In one embodiment, the sensor 36 is hard wired to pads (not shown) on the back or trailing edge 18 of the slider. The wire may be in electrical communication with a microprocessor (not shown), so that the storage medium 4 can electrically communicate through the sliders 8, 10 to the microprocessor. Through this wire the respective slider couples the storage media to the microprocessor. In a preferred embodiment of this invention, the sensor 36 is in the first longitudinal rail 24 of each slider 8, 10 that have the bleed leading edge step 28. Even more preferably, the sensor 36 is disposed proximal the trailing edge 18 of the first longitudinal rail 24, as shown in FIG. 3. In an alternative embodiment, the first slider 8 may have a sensor 36 and a wire in both ends of the first longitudinal rail 24 that has the bleed leading edge step 28, as shown in FIG. 9. In this embodiment, one of the sensors and wires provide a high density core and the other provides a low density core. Preferably, the low density core leads the direction of motion and the high density core trails the direction of motion of the media. Similar to the first slider 8, the second slider 10 may also have a sensor 36 and a wire and the second slider 10 may have any of these embodiments shown in FIGS. 5–11, so long as that it matches the embodiment of the first slider 8.

Figure 12:
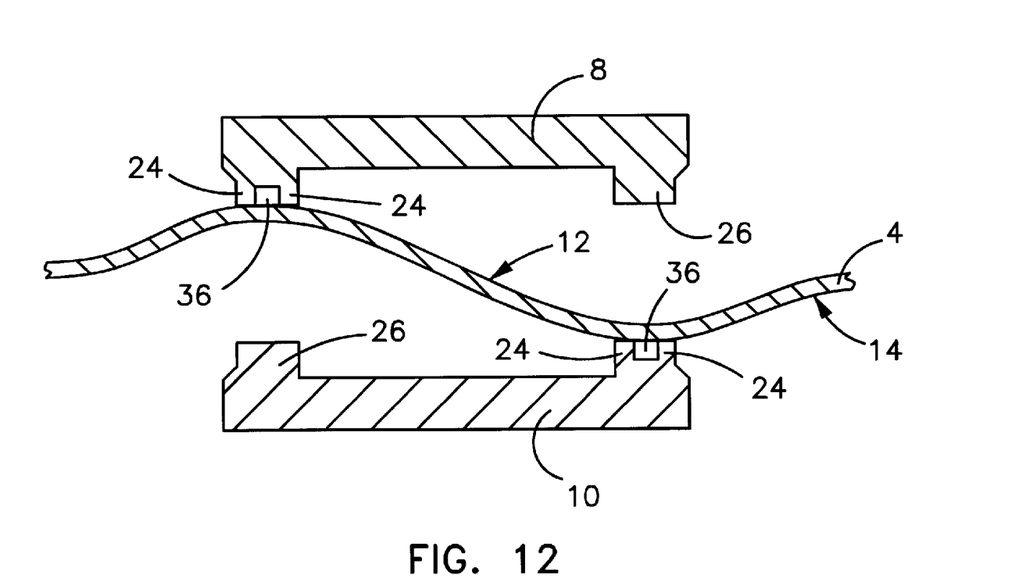
FIG. 12 is a cross section taken along line 12—12 of FIG. 4.
Figure 13:
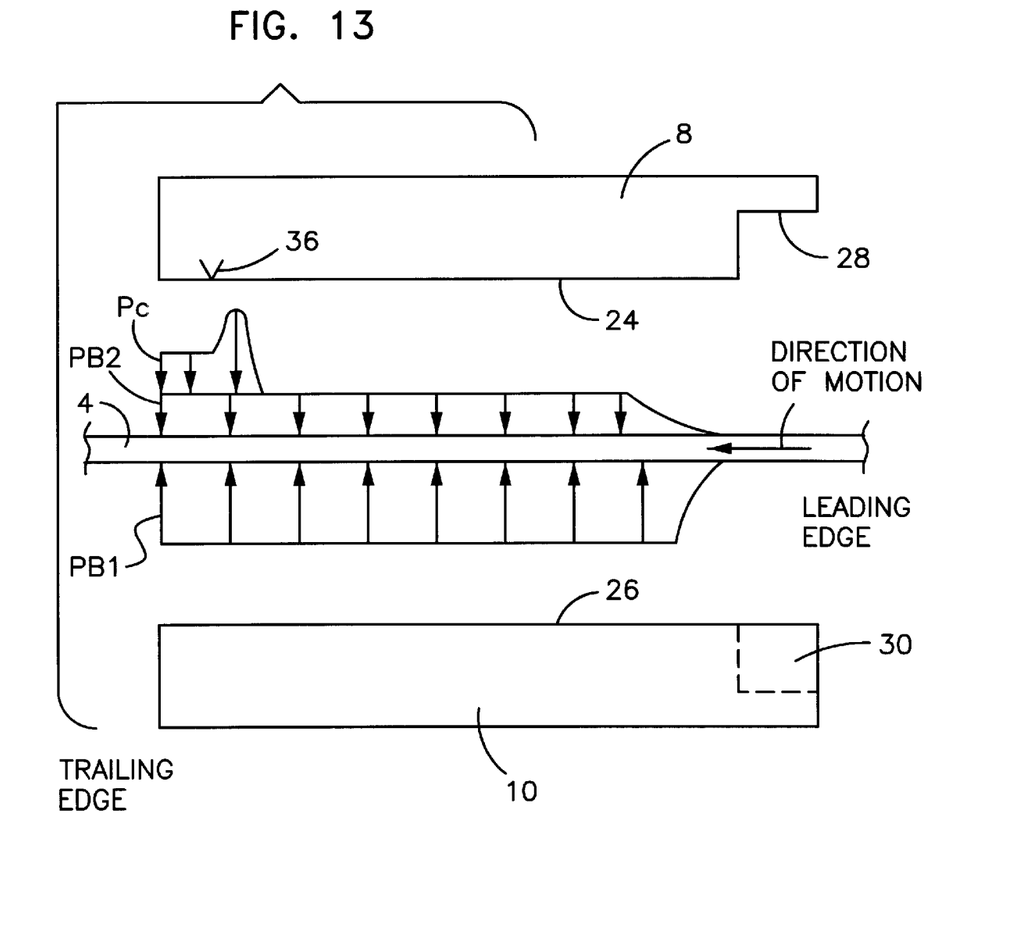
FIG. 13 is a diagram illustrating the operation of the head assembly of FIG. 1.

FIGS. 1, 4 and 12 depict the operation of the head assembly 2 of this invention. As shown, in the interfacing position the storage medium 4 of the disk drive is disposed between the first and the second slider 8, 10. The first slider 8 is disposed proximal to the first or top surface 12 of the storage medium, and the second slider 10 is disposed proximal to the second or bottom surface 14 of the storage medium 4. In operation, the storage medium 4 is rotated by a disk drive spindle motor (not shown), or the like. The direction of rotation of the storage medium 4 is into the leading edges 16 of the sliders 8, 10. While rotating, an air bearing is created between each of the sliders 8, 10 and the storage medium 4. The bleed leading edge step 28 in the first rail 24 of each of the sliders 8, 10 allows some of the air entering an area between the first rail 24 of the first and the second sliders 8, 10 and the disk medium 4 to flow or bleed away. Therefore, only a portion of the air entering the bleed leading edge step 28 actually flows under the first rail 24. This results in a less robust air bearing under the first rail 24 having sensor 36 than might otherwise form. This creates an air bearing $P_{B2}$ having a relatively low pressure, in the region between the first rail 24 of the first slider 8 and the disk medium 4, as shown in FIG. 13.

In addition, the structured leading edge step 30 in the second rail 26 of each of the sliders 8, 10 traps substantially more of the air entering an area between the second rail 26 of the first and the second sliders 8, 10 and the disk medium 4. This results in a more robust air bearing being formed under the second rail 26 not having a sensor. This creates an air bearing $P_{B1}$ having a relatively high pressure, as compared to the air bearing $P_{B2}$ under the first rail 24, in the region between the first rail 24 of the first slider 8 and the disk medium 4, as shown in FIG. 13. Because of these areas of relatively low pressure $P_{B2}$ and relatively high pressure $P_{B1}$, the storage medium 4 deflects substantially as shown in FIGS. 1, 4 and 12 toward the trailing edges 34 of the first rail 24 having the sensor 36 of each of sliders 8, 10. It will be appreciated that the storage medium 4 deflects upward toward the sensor rail 24 in the first or upper slider 8 and downward toward the sensor rail 24 in the second or bottom slider 10, as best shown in FIG. 12. This deflection occurs from the relatively high pressure $P_{B1}$ resulting from the structured leading edge step 30 opposed by the relatively low pressure resulting from the bleed leading edge step 28 in the respective slider to the trailing edge of the respective slider. As shown in FIGS. 4 and 12, the storage medium 4 deflects in a ripple or wave shape since it is deflecting both upward and downward.

By deflecting the storage medium 4 toward the trailing edges 18 of the first and the second slider 8, 10, the performance of the head assembly 2 is improved. In particular, since the storage medium 4 deflects toward the sensors 36 in the first rails 24, the performance of the head assembly 2, will be improved.

In a preferred embodiment of this invention, the first and the second slider 8, 10 have the following dimensions. However, these dimensions are provided by way of example and not by way of limitation. These dimensions are for a "nano" slider. However, this invention may be employed with sliders of a variety of well known, industry standard sizes, including but not limited to, standard, micro, pico, and femto sliders.

Width of sliders=1.5+/−0.1 mm
Length of Sliders=1.9+/−0.1 mm
Width of Rails=0.3+/−0.1 mm
Height of Slider=0.46+/−0.1 mm
Length of Step=0.2+/−0.1 mm With the head assembly of this invention, the flexible media usually deflects so that the trailing edge of the first longitudinal rail having a sensor of each slider actually touches the media. Since the media is tribologically robust (e.g., wear resistant), such as that used in the ZIP® disk cartridge, the media can withstand the contact with the sliders. This contact or closeness between the media and the sensors enhances the electrical communication between the media and the slider. As is generally understood, the voltage or strength of the electrical signal between the slider and the media is dependent upon the spacing between the media and the sensor. The strength of the signal decreases in an exponential relationship with the spacing between the media and the sensor. (This is generally known as the Wallace equation: voltage is proportional to $e^{-2\Pi(spacing)/wavelength}$). Thus, with the media dragging on the rails that have the sensors, the electrical signal is enhanced between the media and the sensor for magnetic recording. This is particularly important for magnetic heads that must interface with improved magnetic media that have a relative high recording density (e.g., more storage capacity), for example magnetic media that have more storage capacity that the ZIP® disk cartridge. As described in further detail below, the head assembly of this invention enhances communication with data storage media such as the ZIP® disk cartridge.

This invention is also significant in enhancing communication with media that are rotated at higher velocities. Sliders typically have a "compliance zone" which defines the range of spacing between the media and the slider in which communication is maintained during rotation of the media. When rotating the media at higher velocities, the media has a tendency to move out of the compliance zone and interrupt the communication between the slider and the media. Therefore, the speed of rotation of the media is limited by the compliance zone. It is desired to increase the speed of rotation of the media to increase the data transmission rate between the media and the sensor. This invention permits increased speeds of rotation of the media by providing contact between the media and the head where the sensor is disposed. This contact ensures that the sensor will remain in communication with the media at higher speeds and thereby permit higher data transmission rates.

Magnetic head assemblies, such as that shown in the Chhabra patents, have leading edge tapers or plain leading edge steps formed on the longitudinal rails in each slider that are aligned with leading edge tapers or plain steps formed on the longitudinal rails in the other slider. Because of this, when the storage media is employed with the head assembly taught by Chhabra, the media will not preferentially deflect toward the sensor in each slider. Rather, because the leading edge tapers or plain steps are aligned in Chhabra, an imbalance of forces is not created and the media is not deflected as taught by the head assembly of this invention. As discussed in the Chhabra patents, the magnetic head assembly taught by Chhabra provides relatively low fly heights. In addition, with the development of higher capacity storage media, lower fly heights are necessary to create the required electrical connection between the media and the sliders. Higher density media require fly heights that are in the range of about 0 to about 75 nano meters. The magnetic head assembly of this invention addresses this need and results in even lower fly heights than that taught by Chhabra and even causes the sliders to drag on the media. This dragging or contact between the media and the slider causes the enhanced communication between the sensor and the media.

In order to further understand the operation of this invention, a schematic force diagram is provided in FIG. 13. FIG. 13 illustrates the operation of the media with the structured leading edge step 30 in the second slider 10 and the bleed leading edge step 28 in the first slider 8. Although the media 4 is shown non-deflected in FIG. 13 for purposes of explaining the invention, it should be understood that the media deflects as greatly exaggerated in FIGS. 1, 4 and 12 in operation. It should be understood that the media will react similarly to the bleed leading edge step 28 in the second slider 10 and the structured leading edge step 30 in the first slider 8, except that the pressures will be reversed in direction, so as to correspond to the surfaces of the rails. As is generally understood, the sliders are preloaded or gram-loaded toward the magnetic media. This gram loading causes a biasing toward the media. The rotation of the storage media combined with this gram loading creates an air bearing between the storage media and the sliders. A contact pressure Pc is also created as the media rotates and contacts the slider.

As shown in FIG. 13, a first more robust air bearing pressure $P_{B1}$ formed on each side of the media sharply increases as the media rotates between the structured leading edge steps 30 of the rails 24, 26. The structured leading edge steps 30 create this sharp increase. A second less robust air bearing pressure $P_{B2}$ formed on each side of the media 4 gradually increases as the media rotates under the bleed leading edge steps 28. The bleed leading edge steps 28 create this gradual increase. The more robust air bearing pressure $P_{B1}$ imposes an air bearing pressure upward onto the media 4 which is of a greater magnitude than the less robust air bearing pressure $P_{B2}$. As a result, this greater upward pressure $P_{B1}$ accelerates the media upward toward the sensor rail 24. Because the media contacts, the first or top slider a contact pressure Pc is exerted downward on the media. This contact pressure combines with the air pressure $P_{B2}$ exerted by the upper slider to oppose the air pressure $P_{B1}$ exerted by the bottom slider and cause the media to deflect back downward toward its level plane. As the media exits the slider, the media becomes level again because the pressures are removed. The structured leading edge step in the first or top slider 8 operates similarly.

In summary, since the structured leading edge step 30 in each rail is aligned with a bleed leading edge step 28 in the opposing rail, the air bearing on the surface of the media near the structured leading edge step 30 is a greater magnitude than the air bearing on the surface of the media near the bleed leading edge step 28. This imparts momentum to the media to deflect toward the rail 24 with the bleed leading edge step 28 and closer to the sensor 36. This also causes lower flying heights and contact between the media and the slider where it is desired, at the location of the sensor. This enhances the electrical signal between the media and the slider and enables higher density media to be used.

In reality, when the media is spun it wrinkles and vibrates. The surface of the media does not remain flat because it is spinning and relatively flexible. By deflecting the media toward the sensor and creating a contact pressure between the media and the sensor, the media is flattened proximal to the sensor. This enhances the communication between the media and the sensor. This should be compared to the heads taught by Chhabra which provides no preference for deflecting the media toward the sensor.

The head assembly of this invention can also be employed with optical media and optical sensors such as near field optical sensors and far-field optical sensors.

Another advantage of the tuned leading edge step scheme of the present invention is that the features of the tuned leading edge step scheme can be easily incorporated into existing, modem manufacturing techniques for the manufacturing of head sliders. For example, the sliders 8, 10 can be fabricated from a ceramic wafer using any suitable conventional technique, including the following exemplary process. First, one or more magnetic transducers are formed on the wafer surface, e.g., by vacuum-depositing the various layers used to form the transducers, and photolithographically patterning those layers. Vacuum-deposition can be accomplished by sputtering or evaporation.

The wafer can then be cut into bars by methods well known in the art. The bars are cut such that a row of transducers are contained on a surface of each bar. Thereafter, a mask is applied to the bar to define the recessed surface areas, e.g., the area between the longitudinal rails 24,26, and the structures leading edge steps 28,30, respectively. In one embodiment, the masking is accomplished photolithographically, using positive or negative photoresist. In other words, photoresist is deposited on the bar, selectively exposed to light, and developed, thereby removing the portion of the resist over the areas where regions the recessed surfaces are to be formed. The resist used to define the recessed region between the rails, as well as the resist used to define the leading edge steps, can also be patterned using other suitable means, such as an e-beam.

The exposed areas of the bar (e.g., where the recessed regions are to be formed) can then be etched by, for example, ion milling, reactive ion etching, laser etching or other suitable processes. By appropriately masking and etching, a plurality of sliders can be formed simultaneously on a single bar.

The sliders can then be cut from the bar. As illustrated in the Figures, there is typically some distance (e.g., between 10 μm and 50 μm) between outer edges of the longitudinal rails 24, 26 and first and second side edges 20, 22 of the sliders 8, 10, respectively. This provides a measure of tolerance to prevent damage to first and second raised side rails 24,26 when the bar is cut into individual sliders during manufacturing.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A head assembly for interfacing with a storage medium on a disk, comprising:
   a first slider having a leading edge, a trailing edge, a first side, and a second side, said first slider comprising:
   (i) a first rail, extending longitudinally along said first side of said first slider, and having a bleed leading edge step formed proximate said leading edge of said first rail for reducing an air bearing under said first rail;
   (ii) a second rail, extending longitudinally along said second side of said first slider, and having a structured leading edge step formed proximate said leading edge of said second rail for improving an air bearing under said second rail;
   (iii) a sensor disposed proximate a trailing edge of said first rail of said first slider for communicating with said storage medium; and
   a second slider aligned with said first slider and having a leading edge, a trailing edge, a first side, and a second side, said second slider comprising:
   (i) a first rail, extending longitudinally along said first side of said second slider and having a bleed leading edge step formed proximate said leading edge of said first rail for reducing an air bearing under said first rail, said first rail of said second slider being aligned with said second rail of said first slider;
   (ii) a second rail, extending longitudinally along said second side of said second slider, said second rail of said second slider being aligned with said first rail of said first slider, and having a structured leading edge step formed proximate said leading edge of said second rail for improving an air bearing under said second rail;
   (iii) a sensor disposed proximate a trailing edge of said first rail of said second slider for communicating with said storage medium; and
   wherein said bleed leading edge step and said structured leading edge step of said first and said second sliders provide a tuned leading edge step scheme for an improved head performance by forcing said storage medium to comply in an advantageous way to cause intimacy at said sensor.

2. The head assembly of claim 1, further comprising varying the shape and dimensions of said leading edge steps to control the flying characteristics of said head assemblies.

3. The head assembly of claim 1, further comprising forming one leading edge step differently from the other.

4. The head assembly of claim 1, wherein said tuned leading edge step scheme moves said storage medium such that said first rail having said sensor of each slider contacts said storage medium while allowing said second rail not having a sensor of each slider and a balance of each slider to fly over said storage medium.

5. The head assembly of claim 1, wherein said each of said bleed leading edge steps comprises a plain leading edge step.

6. The head assembly of claim 5, wherein said plain leading edge steps comprise two surfaces, a first surface being disposed in a substantially horizontal plane and being defined by said leading edge, an inner rail side and an outer rail side, and a bottom edge of said first longitudinal end of said first rail, a second surface being disposed in a substantially vertical plane and being defined by said bottom edge of said first longitudinal end, said inner and outer sides, and a top edge of said first longitudinal end of said first rail.

7. The head assembly of claim 1, further comprising partial air dams and bleed slots formed along an inner rail longitudinal side and an outer rail longitudinal side of said first rail as part of said bleed leading edge step, wherein said partial air dams extend a predetermined distance from said leading edge toward said trailing edge and said bleed slots are defined by a trailing edge of said partial air dams and said first longitudinal ends of said first rail, wherein a portion of air entrained in said bleed leading edge step bleeds out of said bleed leading edge step through said bleed slots thereby reducing air entrainment by said bleed leading edge step.

8. The head assembly of claim 1, wherein said bleed leading edge step further comprises a bleed structure formed as a portion of said first longitudinal end of said first rail and extending into said bleed leading edge step, wherein said bleed structure extends into said bleed leading edge steps to facilitate a flow of air out of a region between said storage medium and said bleed leading edge step thereby reducing air entrainment.

9. The head assembly of claim 8, wherein said bleed structure of said first rail comprises one of a rectangular shape, a square shape, a triangular shape, a curved convex shape, a semi-circle shape, and a semi-oval shape.

10. The head assembly of claim 8, wherein said bleed leading edge step comprises two or more surfaces, including at least one surface being disposed in a substantially horizontal plane and being defined by said leading edge, an inner rail side and an outer rail side, and a bottom edge of said bleed structure, and a second surface being disposed in a substantially vertical plane and being defined by said bottom edge of said bleed structure, said inner and outer rail sides, and a top edge of said bleed structure.

11. The head assembly of claim 8, wherein said bleed leading edge step comprises three surfaces, a first surface being disposed in a substantially horizontal plane and being defined by said leading edge, said inner and outer rail sides, and said bottom edge of said bleed structure, a second surface being disposed in a substantially vertical plane and being defined by a bottom edge of said bleed structure, said inner rail side, a center edge of said bleed air structure, and said top edge of said bleed structure, and a third surface being disposed in a substantially vertical plane and being defined by a bottom edge of said bleed structure, said outer rail side, said center edge of said bleed air structure, and said top edge of said bleed structure.

12. The head assembly of claim 8, wherein said bleed leading edge step comprises four surfaces, a first surface being disposed in a substantially horizontal plane and being defined by said leading edge, said inner rail side, and said bottom edge of said bleed structure, a second surface being disposed in a substantially horizontal plane and being defined by said leading edge, said outer rail side, and said bottom edge of said bleed structure, a third surface being disposed in a substantially vertical plane and being defined by a bottom edge of said bleed structure, said inner rail side, a center edge of said bleed air structure, and said top edge of said bleed structure, and a fourth surface being disposed in a substantially vertical plane and being defined by a bottom edge of said bleed structure, said outer rail side, said center edge of said bleed air structure, and said top edge of said bleed structure.

13. The head assembly of claim 8, wherein said bleed structure extends to said leading edge of said slider.

14. The head assembly of claim 1, wherein each of said structured leading edge step of said second rails comprises an air dam formed along an inner side and an outer side of each structured leading edge step of each second rail, said structured step being formed between said air dams, wherein said air dams act to increase air entrainment and thereby form an improved air bearing under said second rail.

15. The head assembly of claim 1, wherein a surface of said structured leading edge step comprises one of a rectangular shape, a square shape, a triangular shape, a curved concave shape, a semi-circle shape, and a semi-oval shape.

16. The head assembly of claim 1, wherein said structured leading edge step comprises at least two surfaces including at least one surface disposed in a substantially horizontal plane and being defined by said leading edge, a bottom edge of said air dams, and a bottom edge of said first longitudinal end of said second rail, and at least one surface being disposed in a substantially vertical plane and being defined by said bottom edge of said first longitudinal end, a leading side edge of each of said air dams, and a top edge of said first longitudinal end.

17. The head assembly of claim 1, wherein said structured leading edge step comprises three surfaces, a first surface being disposed in a substantially horizontal plane and being defined by a leading edge, and a bottom edge of each of said air dams, a second surface being disposed in a substantially vertical plane and being defined by said bottom edge of a first air dam, said leading side edge of said first air dam, a trailing side edge of said first air dam, and a top edge of said first air dam, and a third surface being disposed in a substantially vertical plane and being defined by said bottom edge of a second air dam, said leading side edge and a trailing side edge of said second air dam, and a top edge of said second air dam.

18. The head assembly of claim 1, wherein said structured leading edge step comprises four surfaces, a first surface being disposed in a substantially horizontal plane and being defined by said leading edge, said bottom edge of said first and second air dams, and a bottom edge of said first longitudinal end of said second rail, a second surface being disposed in a substantially vertical plane and being defined by said bottom edge of said first longitudinal end, trailing sides of said first and second air dams, and a top edge of said first longitudinal end, and a third surface and a fourth surface each being disposed in a substantially vertical plane and being defined by an interior surface of each air dam.

19. A disk drive for receiving a disk cartridge that has a storage medium that has a first surface and a second surface, comprising:
an actuator for communicating with said cartridge and said storage medium;
a head assembly mounted on said actuator, comprising:
a first slider having a leading edge, a trailing edge, a first side and a second side, said first slider having tuned leading edge steps comprising:
(i) a first rail, extending longitudinally along said first side of said first slider, and having a bleed leading edge step formed proximate said leading edge of said first rail for reducing an air bearing under said first rail;
(ii) a second rail, extending longitudinally along said second side of said first slider, and having a structured leading edge step formed proximate said leading edge of said second rail for improving an air bearing under said second rail;
(iii) a sensor disposed proximate a trailing edge of said first rail of said first slider for communicating with said storage medium; and
a second slider aligned with said first slider and having a leading edge, a trailing edge, a first side, and a second side, said second slider having tuned leading edge steps comprising:
(i) a first rail, extending longitudinally along said first side of said second slider and having a bleed leading edge step formed proximate said leading edge of said first rail for reducing an air bearing under said first rail, said first rail of said second slider being aligned with said second rail of said first slider;
(ii) a second rail, extending longitudinally along said second side of said second slider, and having a structured leading edge step formed proximate said leading edge of said second rail for improving an air bearing under said second rail, said second rail of said second slider being aligned with said first rail of said first slider;
(iii) a sensor disposed proximate a trailing edge of said first rail of said second slider for communicating with said storage medium;
wherein said disk cartridge is inserted so that said first surface of said storage medium is proximal to said first slider and said second surface of said storage medium is proximal to said second slider, said tuned leading edge steps functioning to deflect said storage medium toward said sensor thereby improving communications between said actuator and said storage medium when said storage medium is rotated between said first and said second slider.

20. The disk drive of claim 19, wherein said head assembly comprises a magnetic head assembly and said sensors comprise electromagnetic sensors for communication with magnetic storage medium.

21. A disk drive that has an improved magnetic head assembly for interfacing with a removable magnetic disk cartridge that has a magnetic media and a spindle motor for rotating said magnetic media when said disk cartridge is inserted into said disk drive, comprising:
a first slider that has a tuned leading edge step configuration including a bleed leading edge step formed in a first longitudinal rail, a structured leading edge step formed in a second longitudinal rail, and a sensor disposed proximate a trailing edge of said first longitudinal rail for interfacing with said magnetic media;
a second slider that has a tuned leading edge step configuration including a bleed leading edge step formed in a first longitudinal rail, a structured leading edge step formed in a second longitudinal rail, and a sensor disposed proximate a trailing edge of said first longitudinal rail for interfacing with said magnetic media; and
an actuator on which said first slider and said second slider are mounted, said first slider being disposed above said second slider, said sliders being aligned so that said first longitudinal rail of each slider is aligned with said second rail of said other slider;

said magnetic media being disposed between said sliders in said disk drive and rotated by said spindle motor, wherein said bleed leading edge steps and said structured leading edge steps of said tuned leading edge step configuration of each slider act to deflect said storage medium toward said sensor of said first rail to improve communications between said sliders and said magnetic media thereby improving the performance of said head assembly.

22. The disk drive of claim 21, wherein said structured leading edge step comprises an air dam formed along each side of each structured leading edge step of each second rail, said structured step being formed between said air dams, wherein said air dams act to increase air entrainment and thereby form an improved air bearing under said second rail, and wherein said each of said bleed leading edge steps comprises a plain leading edge step which allows entrained air to bleed out of said bleed leading edge step to reduce an air bearing formed under said first rail.

23. The disk drive of claim 21, wherein each bleed leading edge step further comprises a bleed structure, said bleed structure being formed as a portion of said first longitudinal end of said first rail and extending into said bleed leading edge step toward said leading edge, wherein said bleed structure extends into said bleed leading edge steps to facilitate a flow of air out of a region between said storage medium and said bleed leading edge step thereby further reducing air entrainment.

24. The head assembly of claim 21, further comprising partial air dams and bleed slots formed along said first and second longitudinal sides of said first rail as part of said bleed leading edge step, wherein said partial air dams extend a predetermined distance from said leading edge toward said trailing edge and said bleed slots are defined by a trailing edge of said partial air dams and said first longitudinal ends of said first rail, wherein a portion of air entrained in said bleed leading edge step bleeds out of said bleed leading edge step through said bleed slots thereby controlling air entrainment by said bleed leading edge step.

* * * * *